INVENTORS:
WILLIAM H. BECHMAN
JACK O. WINSOR

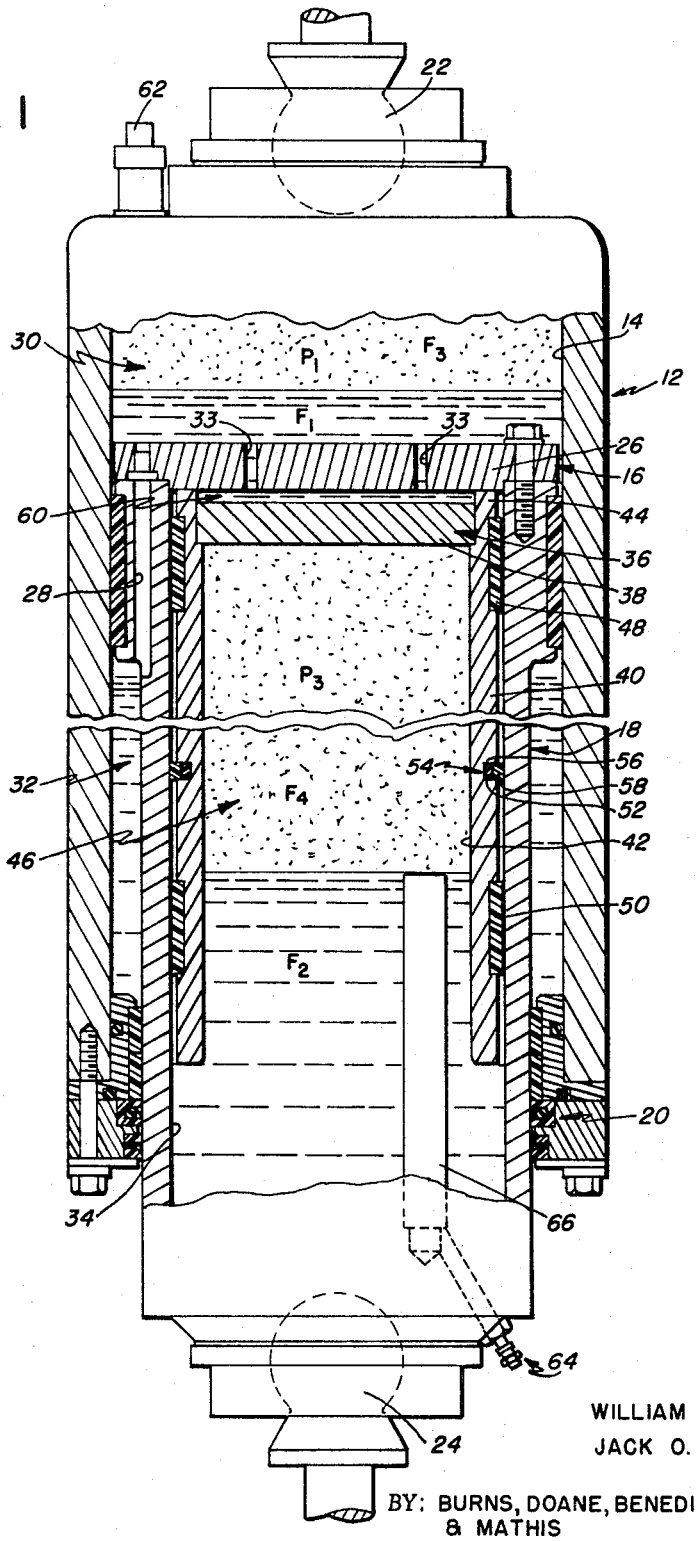
FIG. I
INVENTORS:
WILLIAM H. BECHMAN
JACK O. WINSOR
BY: BURNS, DOANE, BENEDICT, SWECKER & MATHIS
ATTORNEY

BY: BURNS, DOANE, BENEDICT, SWECKER & MATHIS

ATTORNEY

United States Patent Office 3,387,840
Patented June 11, 1968

3,387,840
SUSPENSION UNIT
William H. Bechman, Morton, and Jack O. Winsor, Peoria, Ill., assignors to Westinghouse Air Brake Company, a corporation of Pennsylvania
Filed Oct. 7, 1966, Ser. No. 585,124
11 Claims. (Cl. 267—64)

The present invention relates generally to suspension units for vehicles, and more particularly to vehicle suspension units of the hydro-pneumatic type.

Hydro-pneumatic suspension units including a compressible fluid to absorb a load imposed thereon and an incompressible fluid the viscosity of which provides a damping action have enjoyed substantial acceptance. Such suspension units, as typified by those disclosed in U.S. Patent No. 2,769,632 to Bourcier de Carbon, basically comprise a cylinder in which one or more pistons are reciprocally mounted, the cylinder being filled with a compressible fluid, such as oil, and an incompressible fluid, such as nitrogen gas, under a predetermined elevated pressure or precharge. At least one piston includes a restricted orifice therethrough and a piston rod is fixedly connected to this piston so as to extend externally of the cylinder. The precharge on the gas tends to extend the suspension unit with a force equal to the gas precharge pressure multiplied by piston area. Upon exertion of a force tending to telescopically collapse the unit which is greater than the force tending to extend the same, the piston and rod are moved further into the cylinder. As the rod moves further into the cylinder, the volume that the fluids might occupy is decreased and the compressible fluid is further compressed until this fluid is under a high enough pressure to generate a force balancing the load. A shock absorbing or rebound damping effect is achieved by virtue of the fact that after load removal, the pressurized fluid tends to extend the unit but the orifice in the piston restricts passage of incompressible fluid from one side of the piston to the other thereby temporarily retarding suspension unit extension. But still further, such devices are sometimes provided with a floating piston having a seal assembly positioned in the suspension unit to segregate a second volume of compressible fluid which is precharged at the same or an elevated pressure relative to the first volume of compressible fluid. An example of this latter type is disclosed in the U.S. Patent 3,304,076, issued to Richard A. Doversberger Feb. 14, 1967, on application Ser. No. 422,714, filed on Dec. 31, 1964. In such devices, the precharge on the second volume of compressible fluid is such that the floating piston is displaced and the second volume of compressible fluid compressed more than precharge compression only when the vehicle is in the loaded condition, such as when utilized in an off-highway truck filled with a payload. While such devices have been generally satisfactory in a spring function, they have not always provided the proper damping action for a vehicle in a loaded condition and, in some instances, have not properly cushioned the floating piston against damage. Moreover, the seals provided on the pistons to segregate the compressible fluid from the incompressible fluid have not always been operationally effective in their sealing function, and have caused maintenance problems occasioned by wear and failure.

It is a general object of the present invention to provide a suspension unit which avoids or minimizes the problems heretofore discussed.

More specifically, it is an object of the present invention to provide a suspension unit including a floating piston providing a proper damping action in the vehicle loaded condition and a unique cushioning action for the floating piston of the unit.

Still further, it is an object of this invention to provide a suspension unit including seals to segregate the compressible and incompressible fluids, the seals being particularly effective in their sealing function and wherein certain seal service problems heretofore encountered are minimized.

These and other objects and many of the intended advantages will become more readily apparent from the description of the following specification and accompanying drawings, wherein:

FIGURE 1 is a longitudinal section through a suspension unit according to the present invention.

Figure 3:
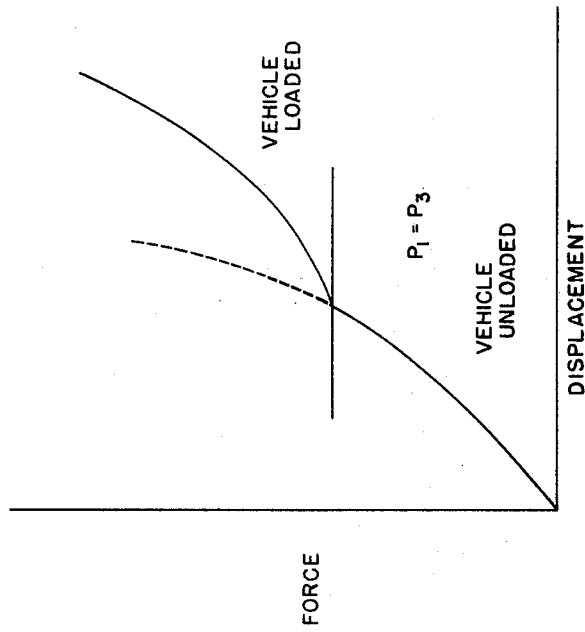
FIGURE 3 is a graph of the force-displacement curve, i.e., the capacity curve, defining certain of the operational qualities of a suspension unit according to the present invention.

Referring in more detail to FIGURE 1 of the drawings, a suspension unit according to the present invention comprises a cylinder assembly 12 having a bore 14 therein. A piston assembly 16 having a rod assembly 18 fixedly connected thereto is slidably positioned within the bore 14 and projects from the lower end thereof. The piston assembly 16 is sealingly retained within the bore 14 by a conventional stop and seal assembly 20 positioned about the periphery of the rod assembly 18 at the lower end of the cylinder assembly 12. Any appropriate connection apparatus, such as upper and lower ball joints 22 and 24, may be provided at the ends of the suspension unit to facilitate connection of the unit to the unsprung and sprung masses of a vehicle. The piston assembly 16 further comprises a piston head 26 having a plurality of vertically extending bores 28 therethrough about the outer periphery of the piston head to provide fluid communication, but restrict fluid flow, between a head chamber 30 above the piston head 26 and a rod chamber 32 below the piston head. A plurality of circularly arranged ports 33 are provided through an intermediate portion of the piston head 26 and form an aspect of the present invention to be discussed more fully hereinafter.

The rod assembly 18 further includes a bore 34 the lower end of which is closed and which slidably receives a floating piston assembly 36. The floating piston assembly 36 includes a floating piston head 38 from which depends a cylindrical skirt 40 having a blind bore 42 therein which is open at its lower end and which defines a third chamber 46. An annular shoulder 44 projects upwardly from the upper surface of the floating piston head 38 to maintain a working surface of the same spaced from the piston head 26. The floating piston assembly 36 is held in spaced relation to the inner periphery of the rod bore 34 by non-sealing, upper and lower wear rings 48 and 50 respectively, fixed about the upper and lower peripheries of the floating piston cylindrical skirt 40. The skirt 40 is further provided with an annular groove 52 about the periphery of any intermediate portion thereof in which is positioned a seal assembly 54 including an O-ring 56 and a seal ring 58, constructed of Teflon or the like, which is urged in a radially outwardly direction by the resilient qualities of the O-ring seal 56. Seal assembly 54 defines the boundaries of and provides a liquid seal between the third chamber 46 and a fourth chamber 60 embraced by the lower surface of the piston head 26 and the upper surface of the floating piston head 38.

To facilitate charging of the suspension unit an upper charging valve 62 is provided in the upper end of the suspension unit in fluid communication with the head chamber 30 and a lower charging valve 64 is provided in the lower end of the suspension unit in fluid communication with a stand pipe 66 which provides fluid communication with, and extends upwardly to a predetermined elevation in the third chamber 46. A first volume F1 of incompressible fluid, such as oil, is provided in the head, rod, and fourth chambers 30, 32 and 60. A second volume F2 of incompressible fluid is provided in the third chamber 46. A first volume F3 of compressible fluid, such as nitrogen gas, is provided in the head chamber 30 above the level of the incompressible fluid F1 and is charged at installation to a pressure P1 which is determined by the suspended vehicle weight. The third chamber 46 is likewise filled with a second volume of compressible fluid F4 which is precharged at a relatively elevated pressure P3 of approximately 400 to 600 p.s.i. depending upon expected load conditions.

Figure 2:
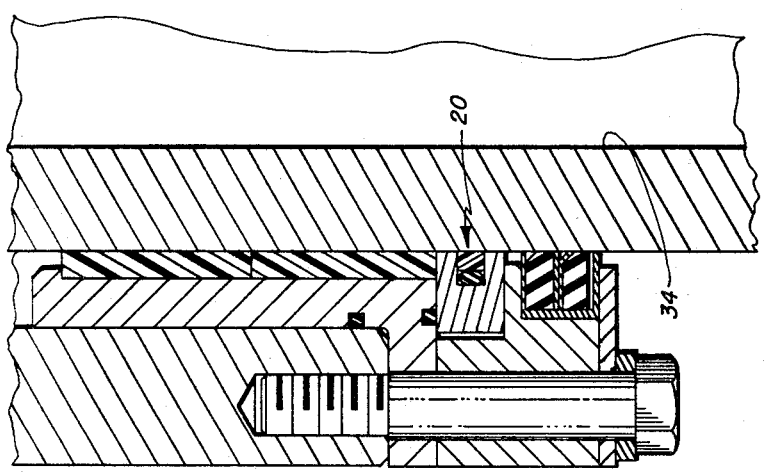
FIGURE 2 is an enlargement of a portion of FIGURE 1, showing details of the lower seal.

As has heretofore been the practice, the pressures P1 and P3 of the compressible fluids F3 and F4 are chosen so that when the vehicle is unloaded, P3 is greater than P1. Accordingly, when the vehicle is empty, the force acting on the piston assembly 16 provided by the fluid F3 alone will support the sprung mass. When the vehicle is loaded, as with a payload, the pressure of fluid F3 increases to a point at which P1 is equal to P3. The effect of this is, as shown in FIGURE 2, to alter the force-displacement curve. The slope of the curve, i.e., the spring rate, beneficially increases as the displacement increases until the pressure of P1 and P3 become equal and the curve breaks with the slope being flattened out or decreased in response to an increase in displacement.

Operation of the suspension unit according to the present invention is as follows. When the vehicle is empty, the weight of the sprung mass tends to telescopically collapse the suspension unit. However, the pressure P1 of the compressible fluid F3 exerts sufficient force to support the empty vehicle without moving the floating piston assembly 36 downward from contact with the lower surface of the piston head 26. The pressure P3 of the compressible fluid has no effect on the unit in the unloaded condition because the pressure P3 is greater than P1 and the floating piston assembly is held against the under surface of the piston head 26 by the pressure of fluid F4. The piston head 26 therefore carries the entire force exerted by the pressure differential acting on the floating piston assembly. As an impact load is applied to the unit tending to collapse it, the fluid F3 will be further compressed, forcing the incompressible fluid through the bores 28 about the outer periphery of piston head 26. Sudden removal of the load will cause the unit to extend at a damped rate because flow of the incompressible fluid from the head to the rod chambers is restricted by bores 28. The incompressible fluid F1, therefore, functions as a damper.

When a vehicle is loaded, as with a payload, the force exerted by the combined weight of the sprung mass and the payload will telescopically collapse the unit and compress the fluid F3 to a point at which the pressure P1 of fluid F3 is equal to the pressure P3 of the fluid F4. Under these circumstances, the application of a shock or impact which tends to collapse the unit will result in additional compression of the fluid F3 above the piston assembly 16, further increasing the pressure P1. As soon as the pressure P1 exceeds pressure P3, a volume of incompressible fluid F1 will be forced through the plurality of ports 33 into the fourth chamber 60 to act on an area about the periphery of the floating piston assembly spaced from the piston head 26 by the shoulders 44. In this way, the floating piston assembly 36 is caused to move downwardly in the rod bore 34 and compress the compressible fluid F4 in the third chamber 46. The volume of compressible fluids supporting the total load is thereby increased.

Of particular significance is the operational effect provided by a plurality of ports 33 upon removal of a load causing displacement of the floating piston assembly 36. But for the restrictive action of the ports 33, return or rebound movement of the floating piston assembly 36, in some instances, might be extremely forceful and generate substantial impact loads as the floating piston assembly rebounds and strikes the underside of the piston head 26. However, because the ports 33 restrict movement of fluid from the fourth chamber into the head chamber, a cushion of fluid is temporarily retained in the fourth chamber to cushion against such impact forces which might damage the pistons and seals. Additionally, such action aids the damping effect provided by the overall suspension unit.

Beneficially, the floating piston assembly 36 is always stationary whenever P3 is greater than P1. Thus, the seal assembly 54 is not moving during substantial pressure differential on the opposite sides thereof. When the floating piston assembly is in motion, the pressure differential between P1 and P3 is small and the movement of the floating piston is in a direction necessary to equalize the pressures. But of particular significance is the aspect of the present invention whereby both operational sides of the seal assembly 54 are contacted and lubricated by incompressible fluid such as oil. It should be noted that the incompressible fluid F1 in the fourth chamber 60 contacts the upper surface of the seal assembly 54. Additionally, the incompressible fluid F2 in the third chamber 46 contacts the lower surface of the seal assembly 54. In this manner the seal is fully lubricated on both operational sides to minimize wear and consequential service problems. But still further, by the provision of a barrier of incompressible fluid on both sides of the seal assembly 54, a better seal between the third and fourth chambers 46, 60 is achieved than would be the case if a compressible fluid such as nitrogen gas F3 contacted the seal. Leakage of fluid F4 would cause reduction of precharge pressure P3 which would create erratic operational characteristics. Such leakage through the seal is avoided by the provision of the incompressible fluid barrier on each side of the seal assembly 54.

It will be appreciated by one skilled in the art that other floating piston locations and seal assembly constructions may be utilized while preserving the advantages noted heretofore.

While a single embodiment of the present invention has been specifically described in this application, it should be understood that additions, deletions, modifications and substitutions and other changes in the specifically described embodiment may be made which fall under the purview of the appended claims.

What is claimed is:
1. A suspension unit for a vehicle comprising:
   a cylinder assembly;
   a piston assembly having a rod portion reciprocally retained within said cylinder assembly and defining therewith a head chamber and a rod chamber;
   a floating piston reciprocally retained in one of said assemblies and defining therewith a third chamber;
   seal means on said floating piston interposed between said head chamber and said third chamber and providing a fluid seal therebetween;
   said rod chamber containing an incompressible fluid;
   said head chamber containing an incompressible fluid and a compressible fluid under pressure, said incompressible fluid contacting said seal means;
   conduit means for permitting flow of said compressible fluid between said head and rod chambers;
   said third chamber containing a volume of incompressible fluid and a volume of compressible fluid under pressure, said volume of incompressible fluid contacting said seal means thereby providing with said incompressible fluid in said head chamber, a barrier of incompressible fluid on both operational sides of said seal means.

2. A suspension unit for a vehicle according to claim 1 wherein said conduit means is defined by a restricted orifice means restricting flow of said incompressible fluid for a damping effect.

3. A suspension unit for a vehicle according to claim 1 wherein said rod portion includes a rod bore reciprocally retaining said floating piston.

4. A suspension unit for a vehicle according to claim 3 wherein said floating piston comprises a piston head, a cylindrical skirt fixed to said piston head, said skirt having a skirt bore open on one end, said third chamber being defined by said piston head, said skirt bore and said rod bore and limited by said seal means.

5. A suspension unit for a vehicle according to claim 4 wherein said seal means includes a sealing element and a resilient element urging said sealing element into contact with said rod bore.

6. A suspension unit for a vehicle according to claim 5 wherein compressible fluid in said third chamber is at a pressure greater than said compressible fluid in said head chamber.

7. A suspension unit for a vehicle according to claim 6 further including wall means fixed to said one of said cylinder and piston assemblies and interposed between said head chamber and said third chamber and defining with said floating piston a fourth chamber in fluid communication with said head chamber, said wall means having restricted orifice means restricting flow from said fourth chamber for cushioning said floating piston against impact with said wall means.

8. A suspension unit for a vehicle comprising:
a cylinder assembly;
a piston assembly having a rod portion reciprocally retained within said cylinder assembly and defining therewith a head chamber and a rod chamber;
a floating piston reciprocally retained in one of said assemblies and defining therewith a third chamber;
seal means on said floating piston interposed between said head chamber and said third chamber;
said rod chamber containing an incompressible fluid;
said head chamber containing an incompressible fluid and a compressible fluid under pressure;
first restricted orifice means for restrictively permitting flow of incompressible fluid between said head and rod chambers for a damping effect;
said third chamber containing a volume of compressible fluid under pressure;
wall means fixed to said one of said assemblies and interposed between said one said assembly and said third chamber and defining with said floating piston a fourth chamber, said wall means having second restricted orifice means restricting flow of fluid to and from said fourth chamber for cushioning said floating piston against impact with said wall means.

9. A suspension unit for a vehicle according to claim 8 wherein said rod portion includes a rod bore reciprocally retaining said floating piston, said wall means defining a piston head of said piston assembly and said second restricted orifice means including a plurality of ports.

10. A suspension unit for a vehicle according to claim 9 wherein said compressible fluid in said third chamber is at a greater pressure than said compressible fluid in said head chamber.

11. A suspension unit for a vehicle according to claim 10 wherein said third chamber further contains an incompressible fluid, said incompressible fluid contacting said seal means.

References Cited

UNITED STATES PATENTS

| 3,304,076 | 2/1967 | Doversberger | 267—64 |
| 3,304,077 | 2/1967 | Eaton et al. | 267—64 |

FOREIGN PATENTS

| 753,132 | 2/1967 | Canada. |
| 1,211,444 | 2/1966 | Germany. |

ARTHUR L. LA POINT, *Primary Examiner.*

R. M. WOHLFARTH, *Assistant Examiner.*

UNITED STATES PATENT OFFICE
CERTIFICATE OF CORRECTION

June 11, 1968

Patent No. 3,387,840

William H. Bechman et al.

It is certified that error appears in the above identified patent and that said Letters Patent are hereby corrected as shown below:

Column 4, lines 63 and 64, "compressible" should read -- incompressible --. Column 5, line 34, the word "seal" should begin at the same margin as "a" in lines 28, 29 and 32.

Signed and sealed this 11th day of November 1969.

(SEAL)
Attest:

Edward M. Fletcher, Jr.

Attesting Officer

WILLIAM E. SCHUYLER, JR.

Commissioner of Patents